(12) United States Patent
Momont et al.

(10) Patent No.: US 6,748,899 B1
(45) Date of Patent: Jun. 15, 2004

(54) SPRING STEM

(75) Inventors: Timothy W. Momont, Wolcottville, IN (US); Philip Wilfong, Goshen, IN (US)

(73) Assignee: CTB IP, Inc., Wilmington, DE (US)

( * ) Notice: Subject to any disclaimer, the term of this patent is extended or adjusted under 35 U.S.C. 154(b) by 0 days.

(21) Appl. No.: 10/356,930

(22) Filed: Jan. 30, 2003

(51) Int. Cl.$^7$ ............................................... A01K 7/00
(52) U.S. Cl. ...................... 119/72.5; 251/120; 251/126
(58) Field of Search .................. 119/72, 72.5; 251/120, 251/125, 126, 84, 336, 339, 349

(56) References Cited

U.S. PATENT DOCUMENTS

| | | | |
|---|---|---|---|
| 1,376,858 A | 5/1921 | Brennan | |
| 2,457,159 A | 12/1948 | Kofford | 119/72.5 |
| 2,486,729 A | 11/1949 | Beckley | 119/72.5 |
| 2,541,369 A | 2/1951 | Kofford | 119/72.5 |
| 2,614,531 A | 10/1952 | Futterer | 119/72.5 |
| 2,939,424 A | 6/1960 | Frederiksen | 119/72.5 |
| 3,072,142 A | 1/1963 | Yancey | 137/512.1 |
| 3,285,298 A | 11/1966 | Gellman | 141/293 |
| 3,322,101 A | 5/1967 | Eagles et al. | 119/72.5 |
| 3,418,977 A | 12/1968 | Godshalk | 119/72.5 |
| 3,433,456 A | 3/1969 | Mueller | 251/339 |
| 3,647,175 A | 3/1972 | Bonneau et al. | 251/61 |
| 3,716,030 A | 2/1973 | Godshalk et al. | 119/72.5 |
| 3,800,825 A | 4/1974 | Zoll | 137/544 |
| 3,874,343 A | 4/1975 | Niki | 119/72.5 |
| 3,887,165 A | 6/1975 | Thompson | 251/339 |
| 4,006,716 A * | 2/1977 | Cross | 119/72.5 |
| 4,246,870 A | 1/1981 | Gustin | 119/75 |
| 4,329,941 A | 5/1982 | Niki | 119/72.5 |
| 4,346,672 A | 8/1982 | Niki | 119/72.5 |
| 4,406,253 A * | 9/1983 | Atchley et al. | 119/72.5 |
| 4,416,221 A | 11/1983 | Novey | 119/72.5 |
| 4,637,345 A * | 1/1987 | Hostetler | 119/72.5 |
| 4,896,629 A | 1/1990 | Johnson | 119/72.5 |
| 4,984,537 A | 1/1991 | Steudler, Jr. | 119/72.5 |
| 5,003,927 A * | 4/1991 | Thompson | 119/72.5 |
| 5,022,421 A | 6/1991 | Johnson | 137/15 |
| 5,044,320 A * | 9/1991 | Le Roy | 119/72.5 |
| 5,154,138 A | 10/1992 | Siddiqui et al. | 119/72.5 |
| 5,193,485 A | 3/1993 | Hostetler | 119/72.5 |
| 5,255,632 A * | 10/1993 | Thomas et al. | 119/51.5 |
| 5,301,635 A * | 4/1994 | Rovira Badia et al. | 119/72.5 |
| 5,402,750 A * | 4/1995 | Katz | 119/72.5 |
| 5,427,058 A | 6/1995 | Chung | 119/72.5 |
| 5,680,970 A | 10/1997 | Smith et al. | 222/514 |
| 6,058,881 A | 5/2000 | Thompson | 119/72.5 |
| 6,072,142 A | 6/2000 | Linder et al. | 218/154 |
| 6,339,998 B1 | 1/2002 | Niki et al. | 119/72.5 |

* cited by examiner

*Primary Examiner*—Yvonne Abbott
(74) *Attorney, Agent, or Firm*—Trexler, Bushnell, Giangiorgi, Blackstone & Marr, Ltd.

(57) ABSTRACT

The invention provides a stem for a watering nipple for use in supplying water to poultry. The stem is hollow and formed of coiled material in a manner similar to that of a coiled spring such that the stem has a number of turns and minuscule gaps provided between adjacent turns. Upon actuation of the nipple, a water-tight seal is broken such that a majority of the water is directed to flow within the stem and directly into the mouth of the poultry. Some water, though, will flow along the outer surface of the stem. This water will either be drawn into the stem through the minuscule gaps, such that it will flow directly into the poultry's mouth, or this water will adhere to the outer surfaces of the stem to attract poultry and allow poultry to drink the water thereon.

20 Claims, 3 Drawing Sheets

6,748,899 B1

SPRING STEM

BACKGROUND OF THE INVENTION

The present invention relates to a unique construction of a watering nipple for use in supplying water to poultry, other fowl, or small animals. More specifically, the invention, relates to a stem formed as a spring for use in a watering nipple that will provide maximum watering to the poultry and minimum drip.

Watering nipples have been used widely for a number of years. The structure of watering nipples has been disclosed, for example, in the following U.S. Pat. Nos. 2,457,159, 2,486,729, 2,541,369, 2,614,531, 2,939,424, 3,322,101, 3,418,977, 3,716,030, 3,887,165, 4,416,221, 4,896,629, 4,984,537, 5,154,138, 5,193,485, and 6,058,881. However, known watering nipples still have disadvantages and problems associated therewith.

For example, some watering nipples are able to retain only a very small amount of water on their outer surfaces for the poultry to drink as the outer surfaces of the pin or stem of the nipples are relatively smooth, such that water does not adhere well to the outer surfaces.

Other watering nipples have a water passageway through the pin or stem of the nipples to allow the poultry to hold its mouth therearound such that the water will flow directly into the poultry's mouth. Such types of watering nipples, though, failed to prevent a significant amount of water from traveling down the exterior of the pin or stem. These watering nipples also required the drilling of a bore through the center of the steel pin such that they were expensive to manufacture. These watering nipples also required a double seal to ensure that a majority of the water flows through the bore of the pin or stem for proper operation, see U.S. Pat. No. 6,058,881 for example.

Therefore, an improved stem or pin for a watering nipple is needed. The present invention provides such a stem for a watering nipple. Features and advantages of the present invention will become apparent upon a reading of the attached specification, in combination with a study of the drawings.

OBJECTS AND SUMMARY OF THE INVENTION

A primary object of the invention is to provide a trigger pin or stem for a watering nipple which has a bore therethrough such that a majority of the water within the nipple is forced into the bore of the stem and will flow directly into the bird's open beak.

Another primary object of the invention is to provide a trigger pin or stem for a watering nipple which is in the form of a spring such that a majority of the water of the water that travels down the exterior of the stem is drawn through gaps between the turns of the spring and into the bore of the stem such that it will flow directly into the bird's open beak.

Another primary object of the invention is to provide a trigger pin or stem for a watering nipple which is in the form of a spring such that water on the exterior of the stem which is not drawn through gaps between the turns of the spring will adhere to the stem, serving to attract birds to the nipple.

Another primary object of the invention is to provide a trigger pin or stem for a watering nipple which is inexpensive to manufacture.

An object of the invention is to provide a watering nipple having single sealing member and a trigger pin or stem with a bore therethrough, but which ensures that a majority of the water flows through the bore of the stem for proper valve operation.

Another object of the invention is to provide a trigger pin or stem for a watering nipple which will provide maximum watering to the birds and minimum drip to the surface upon which the birds are drinking from.

Briefly, and in accordance with the foregoing, a trigger pin or stem for a watering nipple for use in supplying water to poultry is provided. The stem is hollow and formed of coiled material in a manner similar to that of a coiled spring such that the stem has a number of turns and minuscule gaps provided between adjacent turns. Upon actuation of the nipple, a water-tight seal is broken such that a majority of the water is directed to flow through the hollow interior of the stem and directly into the mouth of the poultry. Some water, though, will flow along the outer surface of the stem. This water will either be drawn into the hollow interior of the stem through the minuscule gaps, such that it will flow directly into the poultry's mouth, or this water will adhere to the outer surfaces of the stem to attract and allow poultry to drink the water thereon.

BRIEF DESCRIPTION OF THE DRAWINGS

The features of the present invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

Figure 1:
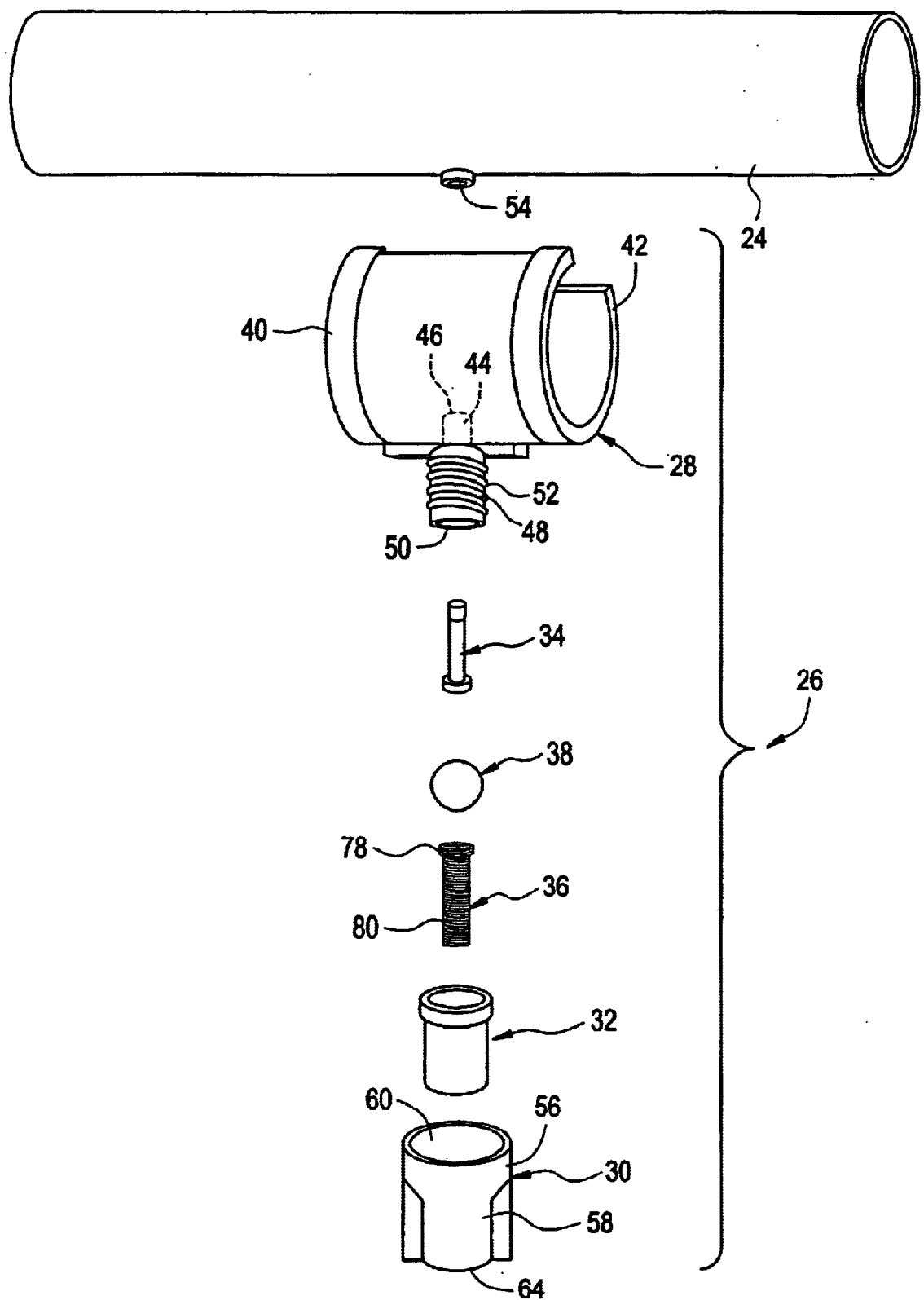
FIG. 1 is an exploded perspective view of a nipple having a stem which is in accordance with the present invention.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated and described herein.

Attention is directed to FIG. 1 which illustrates a nipple 26 which is connected to a watering pipe 24 of a typical watering system for a poultry house. The nipple 26 includes a housing configuration which has an upper body 28, a lower body 30, and an insert 32. The nipple 26 also has a restrictor pin 34, a trigger pin or stem 36 and a ball valve 38.

The upper body 28 includes a pair of resilient arms 40, 42 which function as a saddle to grip one of the pipes 24 and to hold the upper body 28 in its installed position. The upper body 28 further includes a nose portion 44 which is integrally formed with the resilient arms 40, 42 and extends between the resilient arms 40, 42. The nose portion 44 has a bore 46 which extends therethrough. The upper body 28 further includes a cap portion 48 which is integrally formed with the resilient arms 40, 42 and the nose portion 44, and which extends in the opposite direction of the nose portion 44. The cap portion 48 provides a cavity 50 which is in fluid communication with the bore 46 of the nose portion 44. An outer surface 52 of the cap portion 48 is threaded. The upper body 28 is preferably formed of plastic. The nose portion 44 extends through an opening 54 of the pipe 24 to allow water flowing therethrough to flow into the bore 46 of the nose portion 44 and, subsequently, into the cavity 50 defined by the cap portion 48.

The lower body 30 includes an upper cylindrical portion 56 and a lower cylindrical portion 58 which are integrally formed. The upper cylindrical portion 56 has a bore 60 therethrough which defines an inner surface 62 of the upper cylindrical portion 56. The inner surface 62 is threaded. The lower cylindrical portion 58 has a bore 64 therethrough which defines an inner surface 66 of the lower cylindrical portion 58. The bores 60, 64 are in fluid communication with one another and the upper cylindrical portion 56 has an inner diameter which is larger than an inner diameter of the lower cylindrical portion 58. The lower body 30 is preferably formed of plastic. The inner threaded surface 62 of the upper cylindrical portion 56 is capable of threadedly connecting to the outer threaded surface 52 of the cap portion 48 of the upper body 28, such that the cap portion 48 is positioned within the bore 60 of the upper cylindrical portion 56 of the lower body 30, thus placing the cavity 50 in fluid communication with the bore 64.

The insert 32 is pressed-fit into the lower cylindrical portion 58 of the lower body 30 and includes a frusto-conical passage portion 68, an annular surface or valve seat 70, a cylindrical surface or bore 72, a valve seat 74 and a valve seat 76. The frusto-conical passage portion 68 is in fluid communication with the bore 72 and the bore 72 is in fluid communication with the bore 60 of the upper cylindrical portion 56 of the lower body 30 and with the cavity 50 of the cap portion 48 when the lower body 30 is connected to the upper body 28. The insert 32 is preferably formed of metal.

The restrictor pin 34 extends through the bore 46 of the nose portion 44 of the upper body 28 and into the pipe 24 with a clearance selected to provide a restricted and regulated flow of water through the bore 46 of the nose portion 44. The restrictor pin 34 is preferably formed of metal.

The stem 36 includes a head portion 78 and a pin portion 80 which extends therefrom. The head portion 78 and the pin portion 80 are both integrally formed by a coiled material, such as spring steel, in a manner similar to that of a coiled spring. As the head and pin portions 78, 80 are coiled, a bore 82 is formed through the head portion 78 and a bore 84 is formed through the pin portion 80, with the bores 82, 84 being in fluid communication with one another. The head portion 78 has inner and outer surfaces 86, 88 with the inner surface 86 being defined by the bore 82. The pin portion 80 has inner and outer surfaces 90, 92 with the inner surface 90 being defined by the bore 84. The head portion 78 has an inner diameter which is larger than an inner diameter of the pin portion 80 and the head portion 78 has an outer diameter which is larger than an outer diameter of the pin portion 80. Thus, a shoulder 94 is provided between the head and pin portions 78, 80 of the stem 36.

As the head portion 78 is formed of coiled material, the head portion 78 is wound to have a number of turns 96 provided thereon. As utilized herein, a "turn" is defined as a single loop of the coiled material. The head portion 78 preferably has three to four turns 96 provided thereon. Minuscule gaps 98 are provided between each of the adjacent turns 96 on the head portion 78.

As the pin portion 80 is formed of coiled material, the pin portion 80 is wound to have a number of turns 100 provided thereon. The pin portion 80 preferably has eighteen turns 100 provided thereon. Minuscule gaps 102 are provided between each of the adjacent turns 100 on the pin portion 80.

The head portion 78 of the stem 36 is positioned within the bore 72 of the insert 32 such that the shoulder 94 of the stem 36 rests on the valve seat 70 of the insert 32. The pin portion 80 thus extends into and through the frusto-conical passage portion 68 of the insert 32 such that an end portion 104 of the pin portion 80 extends freely from the insert 32 and the lower body 30, and such that the pin portion 80 can be moved within the frusto-conical passageway portion 68 of the insert 32, thus moving the head portion 78 of the stem 36.

The ball valve 38 is positioned to rest against the valve seats 74, 76 of the insert 32 and a top end 106 of the head portion 78 of the stem 32. The ball valve 38 is further positioned within the cavity 50 of the cap portion 48 of the upper body 28. The ball valve 38 provides a water-tight seal between the cavity 50 of the cap portion 48 and the bore 72 and frusto-conical passageway portion 68 of the insert 32. The ball valve 38 is the only seal member provided in the nipple 26. The ball valve 38 is preferably formed of metal.

Figure 2:
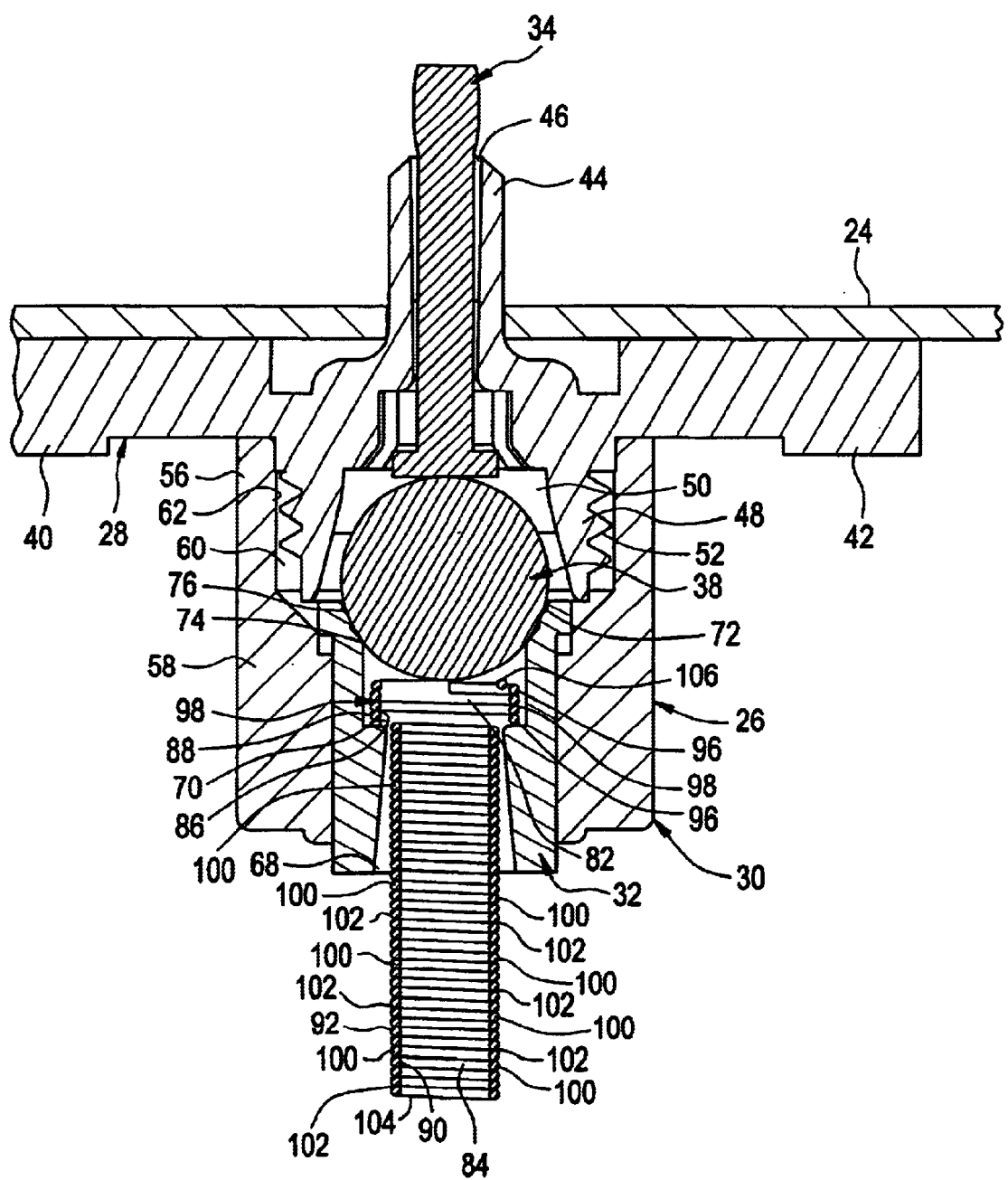
FIG. 2 is a cross-sectional side view of the nipple illustrated in FIG. 1 with the stem positioned within the nipple to prevent liquid from flowing through the nipple.
Figure 3:
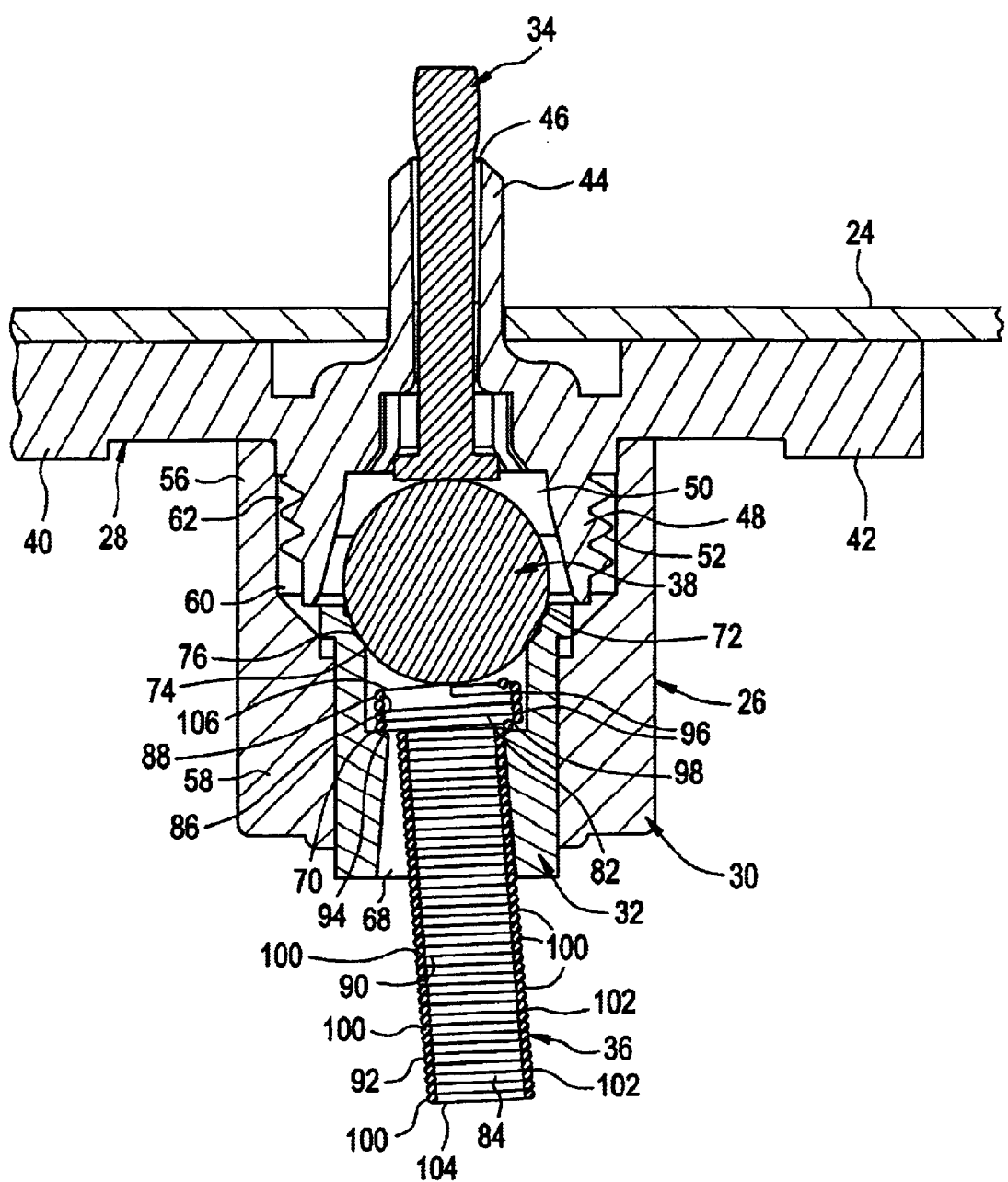
FIG. 3 is a cross-sectional side view of the nipple illustrated in FIG. 1 with the stem position within the nipple to allow liquid to flow through the nipple and into and through the stem.

The operation of the nipple 26 will now be discussed with reference to FIGS. 2 and 3. Water flowing through the pipe 24 is allowed to enter the nipple 26 by flowing through the bore 46 of the nose portion 44 of the upper body 28 of the nipple 26. The restrictor pin 34 regulates the flow of the water through the bore 46 of the nose portion 44.

The water which flows into the bore 46 of the nose portion 44 then flows into the cavity 50 of the cap portion 48 of the upper body 28 of the nipple 26. When the nipple 26 is not being actuated, as illustrated in FIG. 2, the ball valve 38 prevents the flow of water from the cavity 50 of the cap portion 48 into the bore 72 of the insert 32 as the ball valve 38 is seated against the valve seats 74, 76 of the insert 32 to provide a water-tight seal between the cavity 50 of the cap portion 48 and the bore 72 of the insert 32. Thus, the ball valve 38 prevents water from flowing through the nipple 26 unless the nipple 26 is actuated by poultry as will be discussed hereinbelow. If water were to flow through the nipple 26 when the nipple 26 was not actuated, water would be wasted and accompanying sanitary problems would follow.

Thus, for water to reach the bore 72 of the insert 32, and ultimately the poultry drinking from the nipple 26, the ball valve 38 must be unseated from the valve seats 74, 76 of the insert 32 to break the water-tight seal provided by the ball valve 38. The poultry accomplishes this by moving the end portion 104 of the pin portion 80, as illustrated in FIG. 3.

Movement of the end portion 104 of the pin portion 80, in turn, moves the head portion 78 of the stem 36, unseating the shoulder 94 of the stem 36 from the valve seat 70 of the insert 32. The ball valve 38 is also moved off of the head portion 78 upon movement of the head portion 78, thus breaking the water-tight seal and allowing water to flow into the bore 72 of the insert 32.

Once the water has reached the bore 72 of the insert 32, a majority of the water will then flow into bore 82 of the head portion 78 of the stem 36, into the bore 84 of the pin portion 80 of the stem 36 and out of the bore 84. As the bore 82 of the head portion 78 of the stem 36 is fairly large, a large portion of the water which flows into the bore 72 of the insert 32 will flow into the bore 82 of the head portion 78 of the stem 36, and thus into the bore 84 of the pin portion 80 such that the poultry need only mouth the entire end portion 104 of the pin portion 80 to assure maximum watering and minimum drip.

The water that does not flow into the bore 82 of the head portion 78 of the stem 36, will flow along the outer surface 88 of the head portion 78 of the stem 36. Of this water, some of it will continue to flow around the shoulder 94 of the stem 36 to the outer surface 92 of the pin portion 80, while some of it will be drawn into the bore 82 of the head portion 78 through the minuscule gaps 98 provided between the adjacent turns 96 on the head portion 78 by capillary action or gravity, thus assuring that even more of the water will flow out of the bore 84 of the pin portion 80, directly into the poultry's mouth.

The water that flows around the shoulder 94 of the stem 36 to the outer surface 92 of the pin portion 80 will either travel down the outer surface 92 of the pin portion 80 toward the end portion 104 thereof or will be drawn into the bore 84 of the pin portion 80 through the minuscule gaps 102 provided between the adjacent turns 100 on the pin portion 80 by capillary action or gravity, thus assuring that even more of the water will flow out of the bore 84 of the pin portion 80, directly into the poultry's mouth. The water that travels down the outer surface 92 of the pin portion 80 tends to adhere to the outer surface 92 of the pin portion 80 as the water will get hung up on the turns 100 of the pin portion 80, thus attracting poultry to, and allowing poultry to drink the water and reducing the amount of drip of the water from the nipple 26 to the surface upon which the poultry is drinking from.

Thus, the stem 36 of the nipple 26 provides many advantages in comparison to stems of other prior art nipple constructions. The turns 96, 100 of the stem 36 allow the water to adhere to the outer surfaces 88, 92 of the stem 36 better than the smooth exterior stem or pin surfaces of prior art nipple constructions, thus serving to better attract birds to the drinker and further improve water consumption by the flock. In the stem 36, more water also actually travels through the center of the stem 36 in comparison to other prior art nipple constructions because the bore 82 of the head portion 78 is larger than the openings of other stems or pins having water passageways therethrough, and because capillary action and/or gravity draws water that would otherwise travel down the outer surface 88, 92 of the stem 36 into the bores 82, 84 of the stem 36 through the minuscule gaps 98, 102, resulting in essentially all of the water traveling down the bore 84 of the pin portion 80 of the stem 36. With all of the water traveling down the bore 84 of the pin portion 80 of the stem 36, improved water consumption is achieved by delivering the water directly into the poultry's open beak. The stem 36 also provides improved economy in manufacturing by producing a hollow trigger pin without the requirement of drilling a bore through the center of a steel pin, as was done in the prior art. The stem 36 also allows the watering nipple 26 to have only a single sealing member 38 all the while achieving the goal of having a majority of the water flow through the bores 82, 84 of the stem 36, as opposed to other prior art watering nipples which require a double seal to have a majority of the water flow through the bore of the stem. One example of a prior art watering nipple having a double seal to ensure that a majority of the water flows through the bore of the stem is U.S. Pat. No. 6,058,881.

It should be noted that the stem 36 could be utilized in other types of nipple configurations other than that as shown and described with nipple 26 such that it would provide many, if not all, of the same benefits in comparison to the prior art. It should also be noted that the nipple 26 and the stem 36 described hereinabove can be used in other types of watering systems for other types of animals, other than-poultry. It should further be noted that other types of liquid, other than water, could also be dispensed by the nipple 26 and the stem 36.

While a preferred embodiment of the present invention is shown and described, it is envisioned that those skilled in the art may devise various modifications of the present invention without departing from the spirit and scope of the appended claims.

The invention is claimed as follows:

1. A stem for use in a nipple particularly adapted for feeding liquid to fowl and/or small animals, said stem comprising:
   a head portion formed of a coiled material, said head portion having inner and outer surfaces, said inner surface of said head portion being defined by a bore provided through said head portion; and
   a pin portion formed of a coiled material, said pin portion having inner and outer surfaces, said inner surface of said pin portion being defined by a bore provided through said pin portion, said pin portion extending from said head portion such that said bores are in communication with one another, said head portion having an outer diameter which is larger than an outer diameter of said pin portion such that a shoulder is defined between said head portion and said pin portion, whereby the liquid fed to the fowl and/or small animals is capable of flowing through said bores of said head and pin portions.

2. A stem as defined in claim 1, wherein said head portion is provided with at least one turn and wherein the liquid fed to the fowl and/or small animals is capable of flowing along said outer surface of said head portion and adhering to said outer surface of said head portion on said at least one turn.

3. A stem as defined in claim 2, wherein said head portion has a plurality of turns and minuscule gaps provided between adjacent turns, and wherein a large portion of the liquid capable of flowing along said outer surface of said head portion is drawn into said bore of said head portion through said minuscule gaps.

4. A stem as defined in claim 1, wherein said pin portion is provided with at least one turn and wherein the liquid fed to the fowl and/or small animals is capable of flowing along said outer surface of said pin portion and adhering to said outer surface of said pin portion on said at least one turn.

5. A stem as defined in claim 4, wherein said pin portion has a plurality of turns and minuscule gaps provided between adjacent turns, and wherein a large portion of the liquid capable of flowing along said outer surface of said pin portion is drawn into said bore of said pin portion through said minuscule gaps.

6. A stem as defined in claim 1, wherein said head portion is integrally formed with said pin portion.

7. A stem as defined in claim 1, wherein said coiled material of said head and pin portions is spring steel.

8. A stem as defined in claim 1, wherein said shoulder of said stem rests on a seat of the nipple such that said pin portion projects from the nipple to be actuated by the fowl and/or small animals.

9. A nipple particularly adapted for feeding liquid to fowl and/or small animals, said nipple comprising:
   a housing having a passageway through which the liquid can pass, said housing further having a first valve seat and a second valve seat;

a stem formed of a coiled material, said stem having a head portion, a pin portion which extends from said head portion, and a bore which extends through said head and pin portions, said head portion having an outer diameter which is larger than an outer diameter of said pin portion such that a shoulder is defined between said head portion and said pin portion, said shoulder being seated on said first valve seat such that said head portion is positioned within said housing and such that an end portion of said pin portion projects out of said housing; and a sealing member seated on said second valve seat in order to prevent the liquid from passing through said passageway of said housing to said stem, said sealing member being displaceable upon movement of said stem such that liquid is allowed to pass from said passageway of said housing to said stem.

10. A nipple as defined in claim 9, wherein said head portion of said stem is provided with at least one turn wherein the liquid fed to the fowl and/or small animals is capable of flowing along said outer surface of said head portion, when said sealing member is displaced, and adhering to said outer surface of said head portion on said at least one turn.

11. A nipple as defined in claim 10, wherein said head portion of said stem has a plurality of turns and minuscule gaps provided between adjacent turns, and wherein a large portion of the liquid capable of flowing along said outer surface of said head portion, when said sealing member is displaced, is drawn into said bore of said stem through said minuscule gaps.

12. A nipple as defined in claim 9, wherein said pin portion of said stem is provided with at least one turn wherein the liquid fed to the fowl and/or small animals is capable of flowing along said outer surface of said pin portion, when said sealing member is displaced, and adhering to said outer surface of said pin portion on said at least one turn.

13. A nipple as defined in claim 12, wherein said pin portion of said stem has a plurality of turns and minuscule gaps provided between adjacent turns, and wherein a large portion of the liquid capable of flowing along said outer surface of said pin portion, when said sealing member is displaced, is drawn into said bore of said stem through said minuscule gaps.

14. A nipple as defined in claim 9, wherein said coiled material of said stem is spring steel.

15. A nipple as defined in claim 9, wherein said sealing member is a ball valve.

16. A nipple as defined in claim 9, wherein said housing includes an upper body having a bore therethrough, a lower body having a bore therethrough, said lower body being connected to said upper body, and an insert having a bore therethrough, said insert being fixedly positioned within said bore of said lower body, said bores of said upper body, lower body and insert defining said passageway of said housing, said first valve seat being provided by said insert such that said shoulder of said stem is seated on said insert.

17. A nipple as defined in claim 16, further including a restrictor pin which is positioned within said bore of said upper body and restricts and regulates the flow of liquid through the bore of said upper body and the remainder of said nipple.

18. A trigger pin for a watering nipple particularly adapted for feeding liquid to fowl and/or small animals, said trigger pin comprising:

a continuous piece of material which is coiled such that a bore extends therethrough, said continuous piece of material providing a plurality of turns along an outer surface thereof such that minuscule gaps are provided between adjacent turns.

19. A trigger pin as defined in claim 18, wherein said continuous piece of material is formed to have a head portion and a pin portion, said head portion having a larger diameter than said pin portion such that a shoulder is formed between said head portion and said pin portion.

20. A trigger pin as defined in claim 18, wherein said continuous piece of material is spring steel.

* * * * *